United States Patent
Karwath et al.

(10) Patent No.: US 9,450,533 B2
(45) Date of Patent: Sep. 20, 2016

(54) ROTATION-SPEED-CONTROLLED FAN WITH CONTROL OF THE POWER CONSUMPTION OF THE ELECTRIC MOTOR

(75) Inventors: Arno Karwath, Deisslingen (DE); Tobias Maier, Rottweil (DE); Harald Schmid, Emmingen-Liptingen (DE); Richard Kienzler, St. Georgen (DE); Stefan Schneider, Mönchweiler (DE); Frank Heller, Koenigsfeld-Burgberg (DE); Martin Mueller, Seewald (DE); Gerald Hogg, Wutach-Muenchingen (DE)

(73) Assignee: EBM-PAPST ST. GEORGEN GmbH & Co. KG, St. Georgen (DE)

( * ) Notice: Subject to any disclaimer, the term of this patent is extended or adjusted under 35 U.S.C. 154(b) by 186 days.

(21) Appl. No.: 14/112,937

(22) PCT Filed: Aug. 4, 2012

(86) PCT No.: PCT/EP2012/003337
§ 371 (c)(1),
(2), (4) Date: Oct. 20, 2013

(87) PCT Pub. No.: WO2013/020689
PCT Pub. Date: Feb. 14, 2013

(65) Prior Publication Data
US 2014/0042949 A1 Feb. 13, 2014

(30) Foreign Application Priority Data

Aug. 6, 2011 (DE) .................. 10 2011 109 769

(51) Int. Cl.
*H02P 31/00* (2006.01)
*F04D 27/00* (2006.01)

(52) U.S. Cl.
CPC ............. *H02P 31/00* (2013.01); *F04D 27/001* (2013.01); *F04D 27/004* (2013.01); *F04D 27/007* (2013.01)

(58) Field of Classification Search
CPC ............ G05B 13/024; G05B 13/0265; G05B 13/0285; G05B 2219/32015; G05B 2219/32017; G05B 23/0294; G05B 17/02; G05B 2219/32235; G05B 13/0205; G05B 23/0283; H02P 25/22; H02P 31/00; H02P 3/14
USPC ........ 318/430–434, 438, 442, 479, 504, 268
See application file for complete search history.

(56) References Cited

U.S. PATENT DOCUMENTS 4,001,666 A * 1/1977 Grenfell ............................ 322/4
4,823,055 A * 4/1989 Bowman ............... H02P 7/2805
388/811

(Continued)

FOREIGN PATENT DOCUMENTS

DE 21 42 288 3/1973
DE 103 55 651 7/2005

(Continued)

OTHER PUBLICATIONS

Machine translation of EP 1519113 (A2), translating foreign language to English. The EP 1519113 (A2) was published in Mar. 2005.*

(Continued)

*Primary Examiner* — Bentsu Ro
(74) *Attorney, Agent, or Firm* — Milton Oliver

(57) ABSTRACT

An electric fan has a drive motor having a fan rotor, an apparatus for generating a rotation speed signal (n_i), an apparatus for generating a power level signal (P_i) that represents power consumed; a first regulator (n_RGL) for regulating the rotation speed signal (n_i) to a predefined target value (n_s); a second regulator (P_RGL) for regulating the power level signal (P_i) to a predefined power level signal target value (P_s) that corresponds to a predefined minimum consumed power level (P_min), where the first regulator (n_RGL) and the second regulator (P_RGL) apply at least one control output signal (SW) to the drive motor and interact in such a way that, during operation, the at least one control value (SW) in a first state is determined by the first regulator (n_RGL), and in a second state is determined by the second regulator (n_RGL).

15 Claims, 11 Drawing Sheets

(56) References Cited

U.S. PATENT DOCUMENTS

Figure 1:
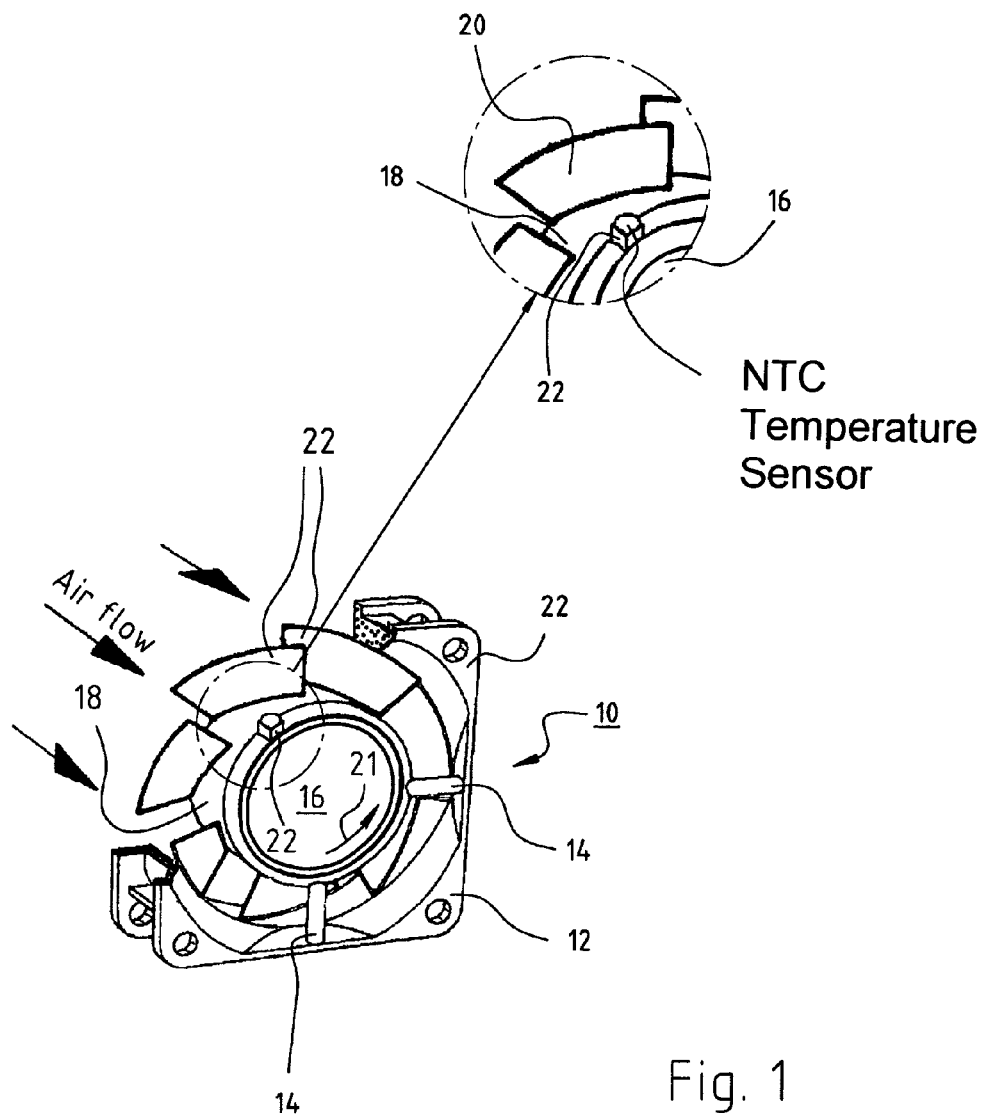

| | | | | |
|---|---|---|---|---|
| 5,343,106 | A | 8/1994 | Lungu | 310/239 |
| 6,452,349 | B1 | 9/2002 | Hahn | 318/254 |
| 6,600,292 | B2* | 7/2003 | James | 320/104 |
| 6,825,632 | B2 | 11/2004 | Hahn | 318/599 |
| 6,860,431 | B2* | 3/2005 | Jayadev | 236/47 |
| 7,095,952 | B2 | 8/2006 | Lelkes | 388/813 |
| 7,291,995 | B2 | 11/2007 | Chen | 318/268 |
| 7,336,045 | B2* | 2/2008 | Clermonts | 318/400.29 |
| 7,880,427 | B2 | 2/2011 | Foell et al. | 318/811 |
| 8,264,176 | B2 | 9/2012 | Gutmann-Karwath et al. | 318/268 |
| 2006/0204383 | A1 | 9/2006 | Kushida | 417/423.2 |

FOREIGN PATENT DOCUMENTS

| | | |
|---|---|---|
| DE | 10 2006 008 685 A | 8/2007 |
| DE | 10 2008 057 870 A1 | 5/2009 |
| DE | 20 2010 013785 U1 | 2/2011 |
| EP | 0 569 738 A1 | 11/1993 |
| EP | 1 519 113 A2 | 3/2005 |
| WO | WO 2011-038884 A1 | 4/2011 |

OTHER PUBLICATIONS

Machine translation of DE 102008057870 , translating foreign language to English. The DE 102008057870 was published in May 2009.*

PID Controller, Wikipedia, 18 pp.; retrieved Oct. 21, 2013 from www.wikipedia.org.

PIC Microcontroller, Wikipedia, 38 pp; retrieved Oct. 21, 2013 from www.wikipedia.org.

\* cited by examiner

ROTATION-SPEED-CONTROLLED FAN WITH CONTROL OF THE POWER CONSUMPTION OF THE ELECTRIC MOTOR

CROSS-REFERENCES

This application is a section 371 of PCT/EP2012/003337, filed 201208-04, published Feb. 14, 2013 as WO 2012-020689-A1, and further claims priority from German application DE 10 2011 109 769.8 filed Aug. 6, 2011.

FIELD OF THE INVENTION

The invention relates to a fan whose fan characteristic curve (graph of air flow rate versus power level) preferably, but not necessarily, exhibits a so-called "saddle" or "pressure saddle."

BACKGROUND

This is understood as a location on the characteristic curve at which the flow stalls as a consequence of detachment of the flow along the fan blades, with the result that the power consumption of the fan, and consequently also the flow rate generated by it, decrease. This phenomenon occurs principally in radial, axial, and diagonal fans, but can also be relevant, for example, in BLDC (BrushLess Direct Current) motors in other applications.

SUMMARY OF THE INVENTION

It is therefore an object of the invention to make available a novel fan wherein electronic controls minimize the "saddle effect".

This object is achieved by providing a first electronic regulator for rotation speed, providing a second electronic regulator for motor power level, and giving one of these two regulators primary influence over a control signal (SW) applied to the motor, depending upon whether the fan motor is in a first predefined state or, alternatively, in a second predefined state. In this manner, the fan rotation speed automatically rises when detachment of the flow along the fan blades is imminent, so that the characteristic curve for flow rate versus pressure remains stable.

The result is that, in the context of characteristic curves having saddles, formation of the saddle is prevented or at least reduced.

An advantageous refinement of the invention is to monitor motor temperature and to regulate the motor power level in a way which will avoid motor overload.

Because, in the context of characteristic curves having saddles, the rise in rotation speed in the region of the pressure saddle can be considerable, e.g. from 6500 to 7300 rpm, i.e. 12 percent, with this refinement, the rise in rotation speed is limited to a value that is within the permissible maximum mechanical upper limit of the fan.

BRIEF FIGURE DESCRIPTION

Further details and advantageous refinements of the invention are evident from the exemplifying embodiments, in no way to be understood as a limitation of the invention, that are described below and depicted in the drawings.

Figure 2:
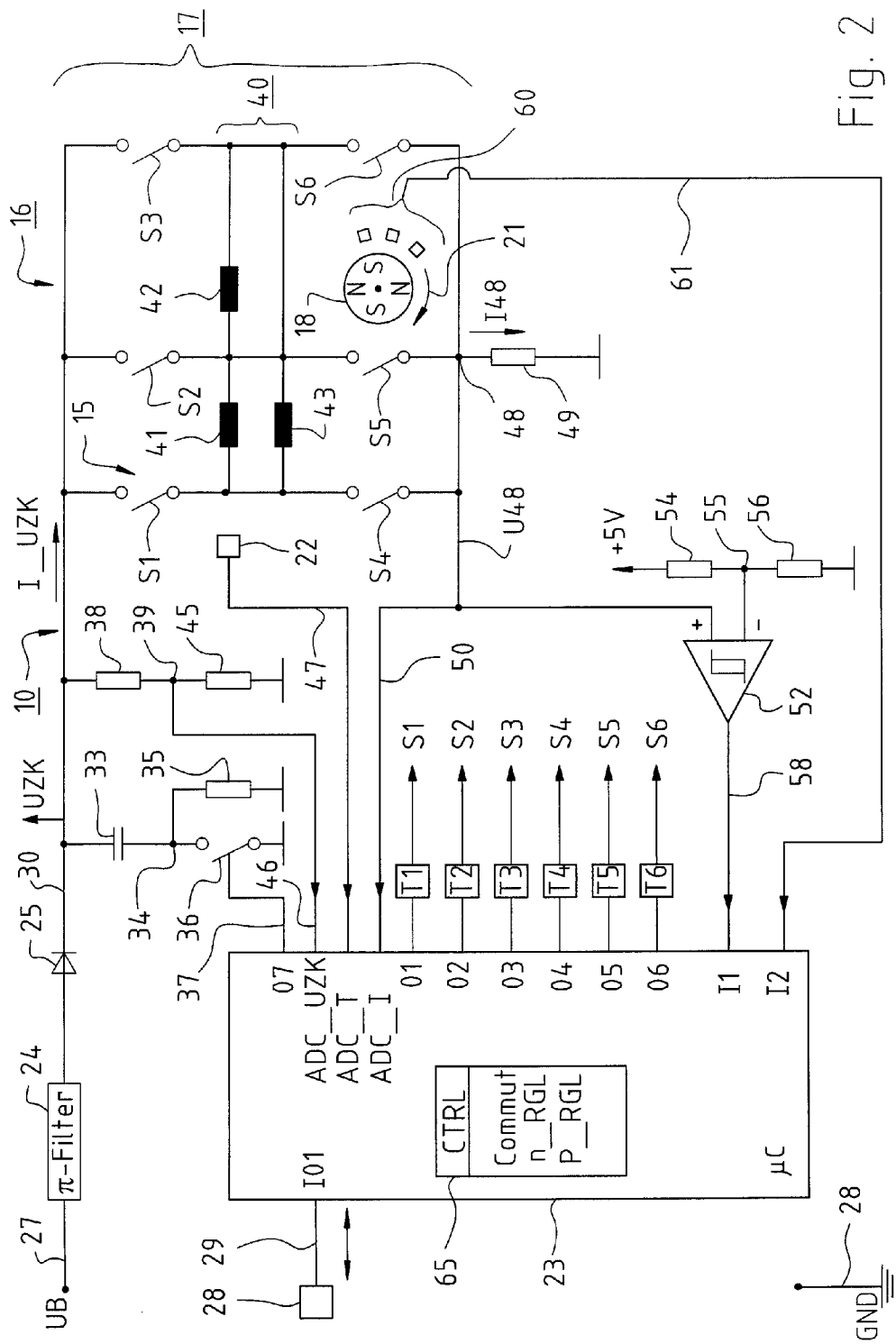
Figure 3:
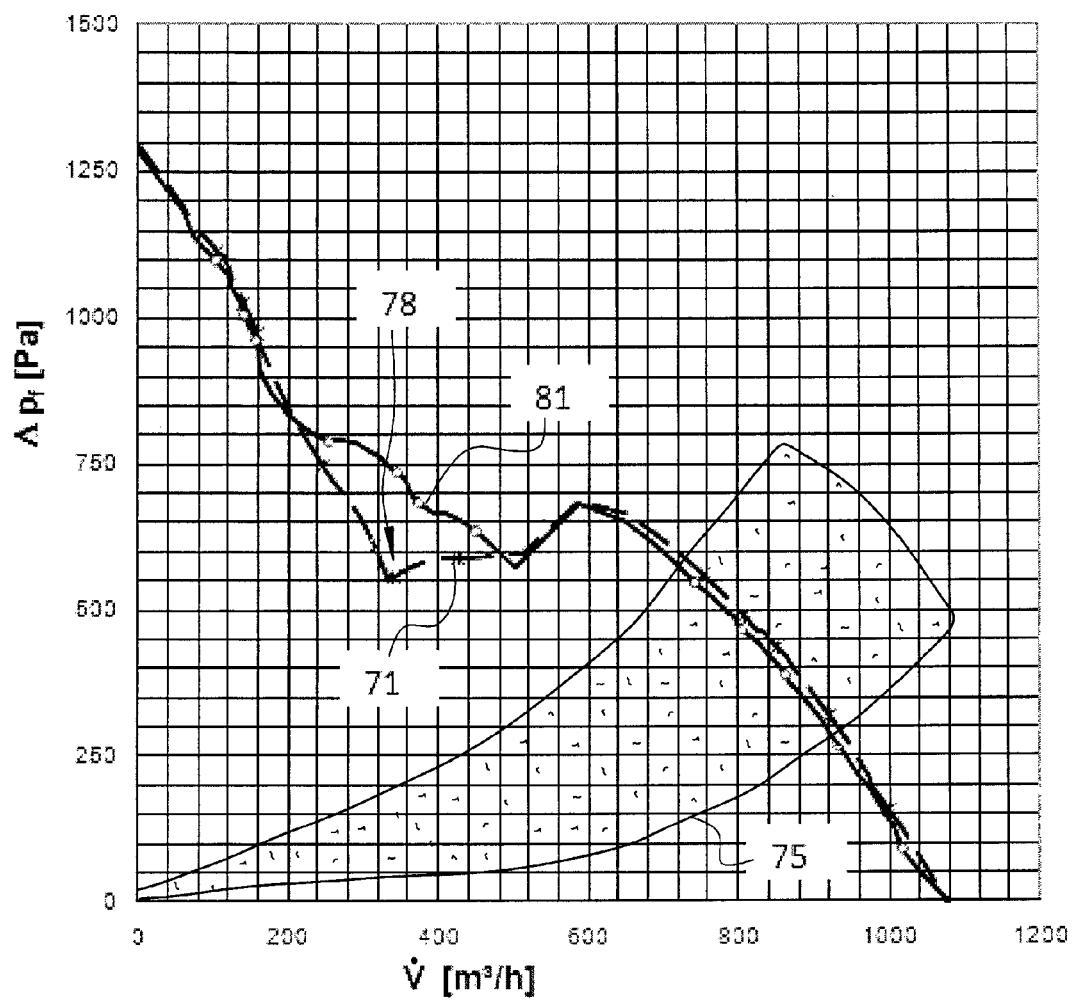
Figure 4:
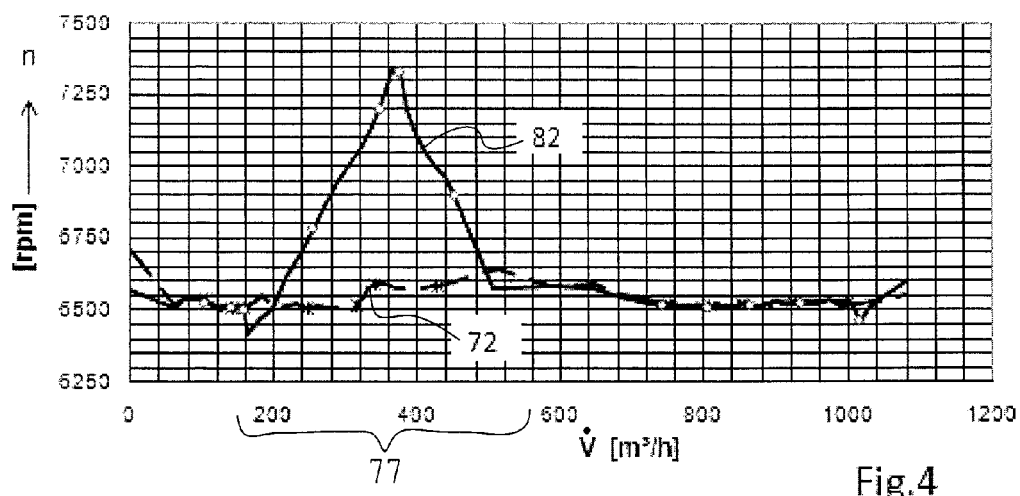
Figure 5:
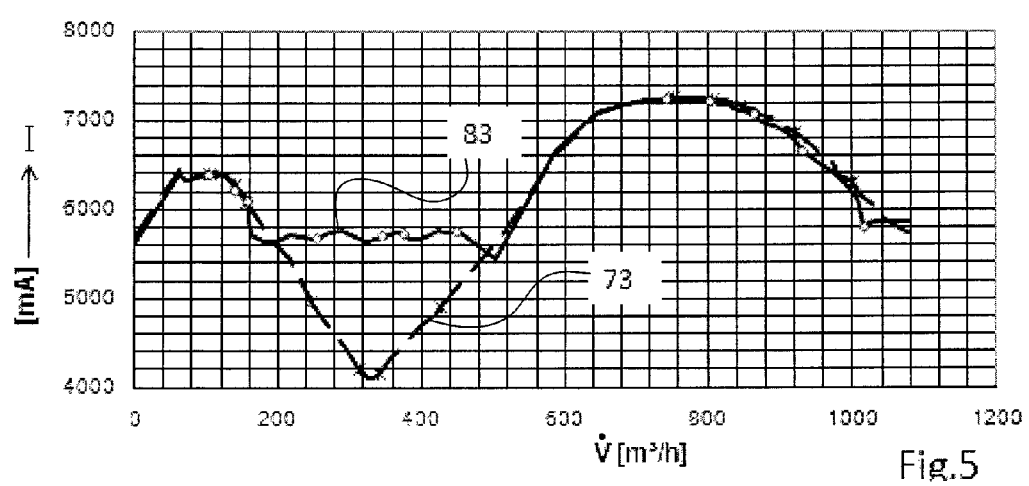
Figure 6:
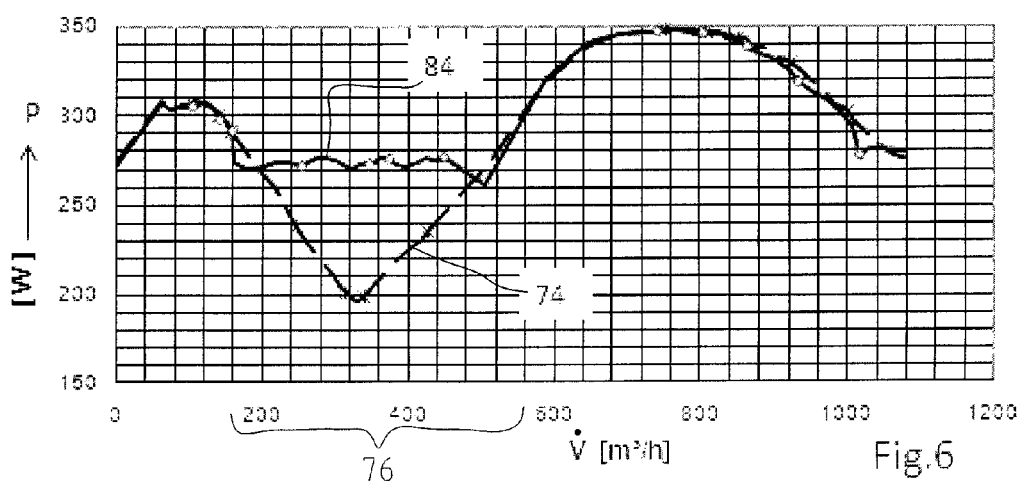
Figure 7:
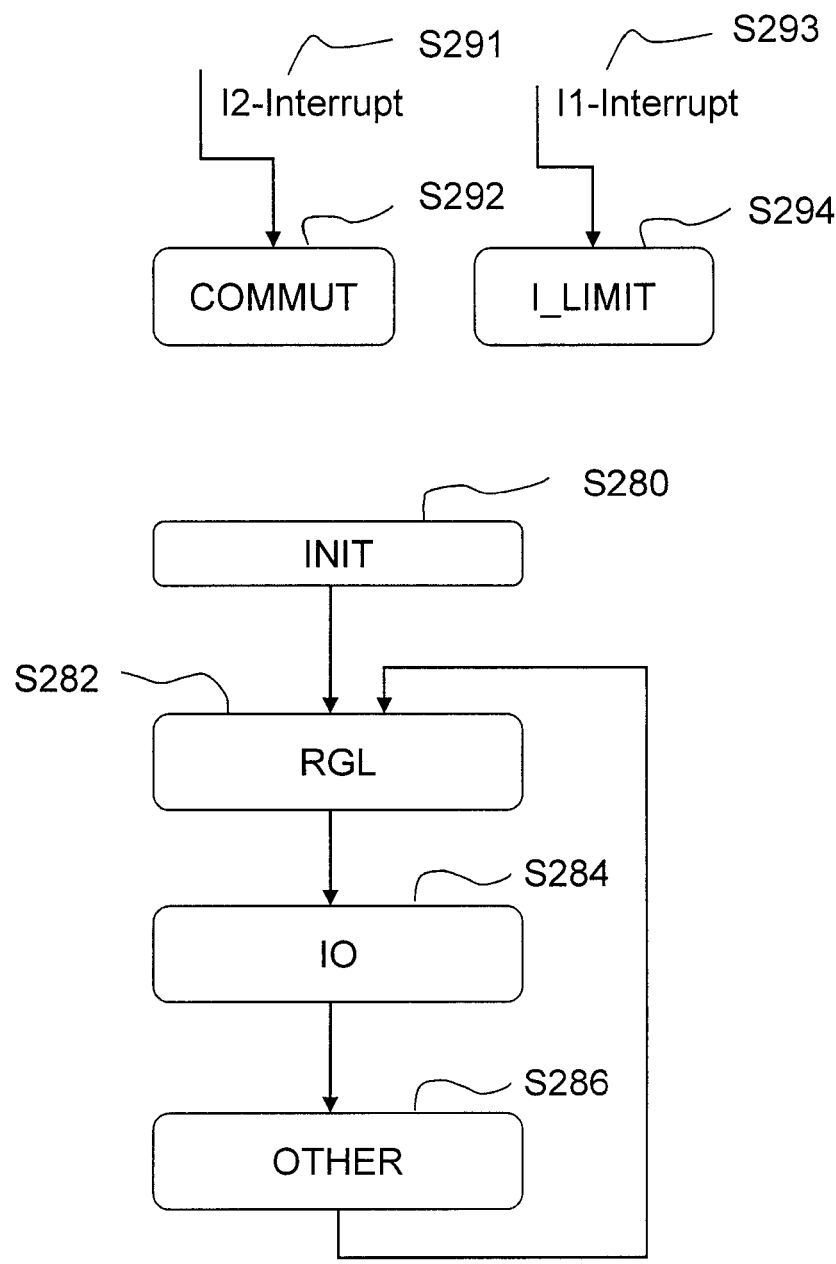
Figure 8:
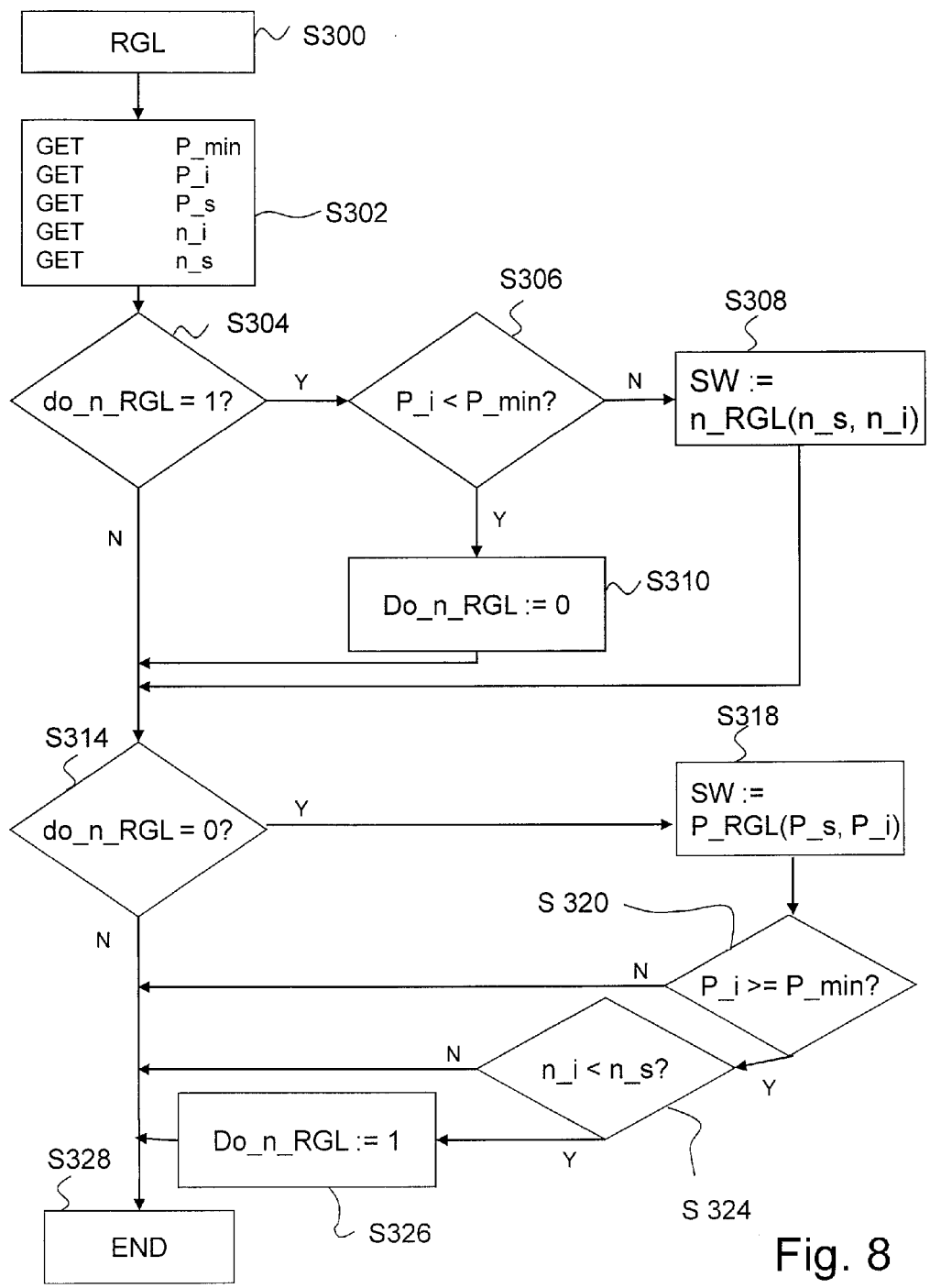
Figure 9:
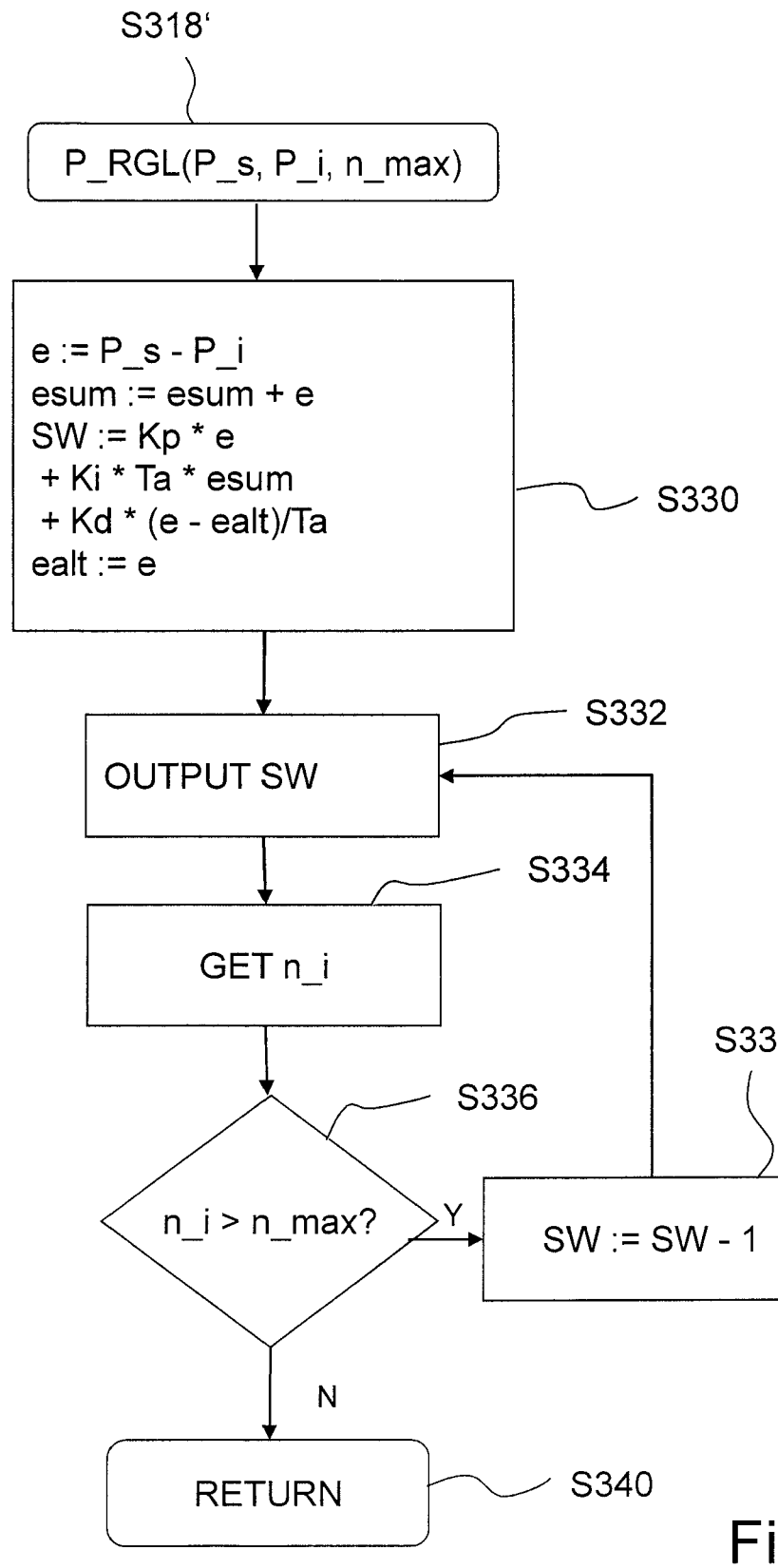
Figure 10:
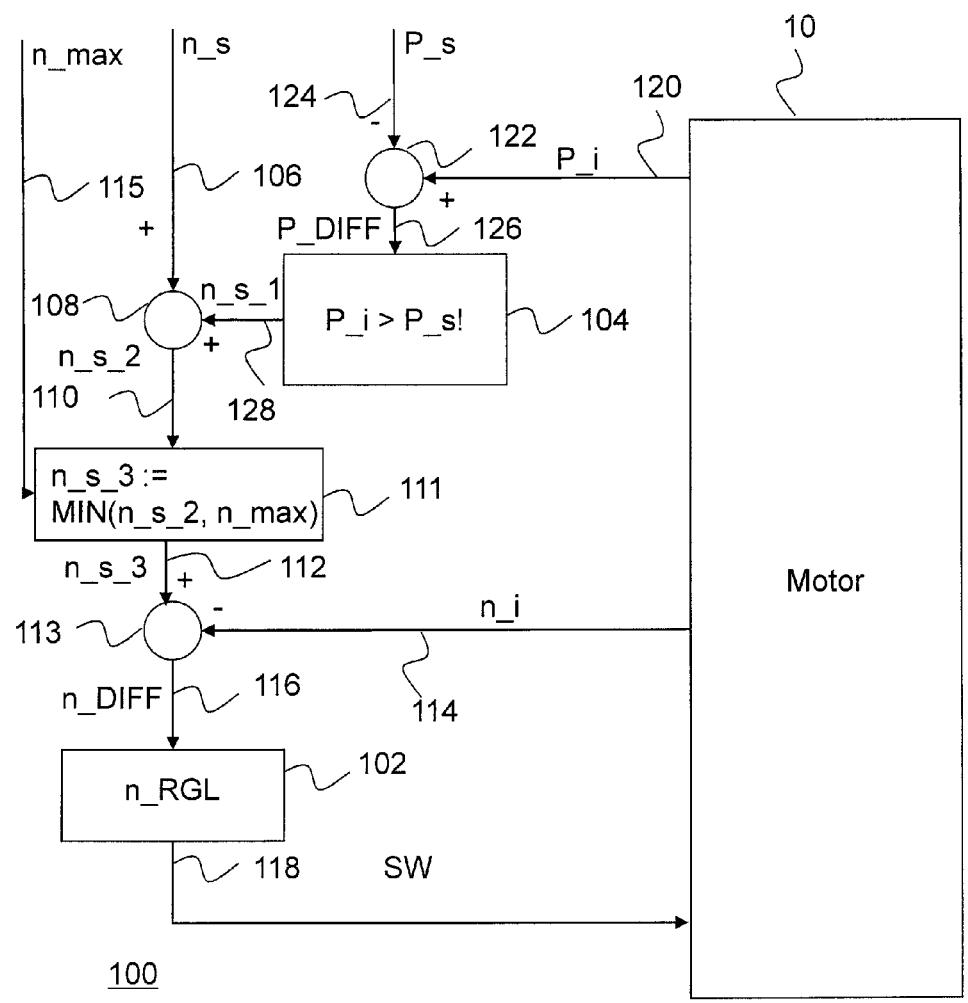
Figure 11:
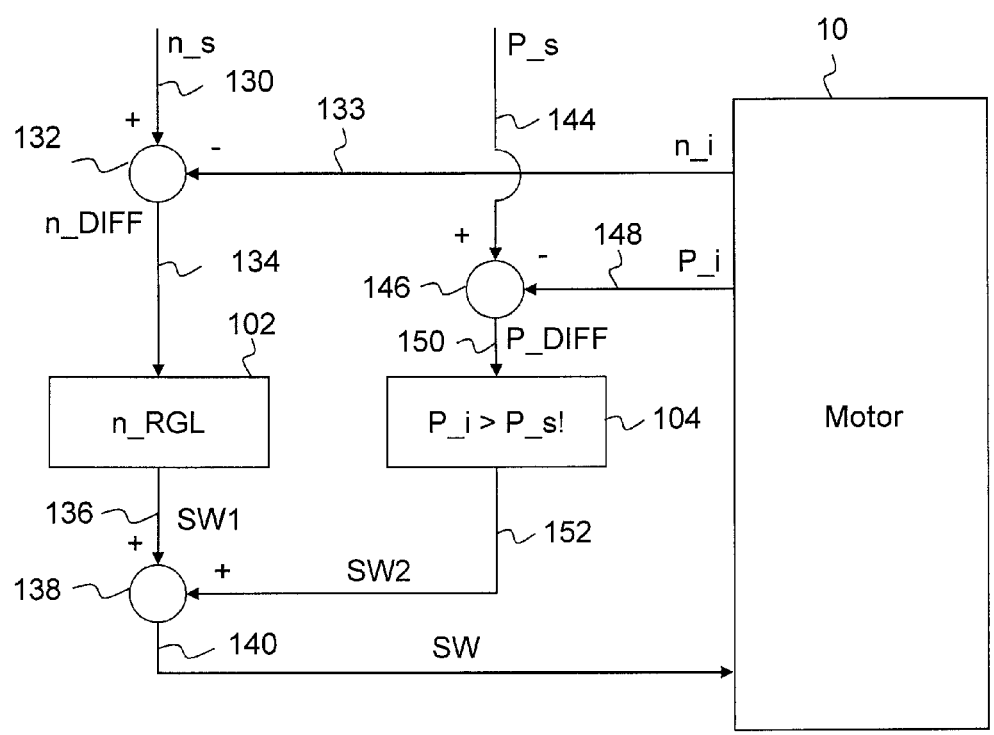
Figure 12:
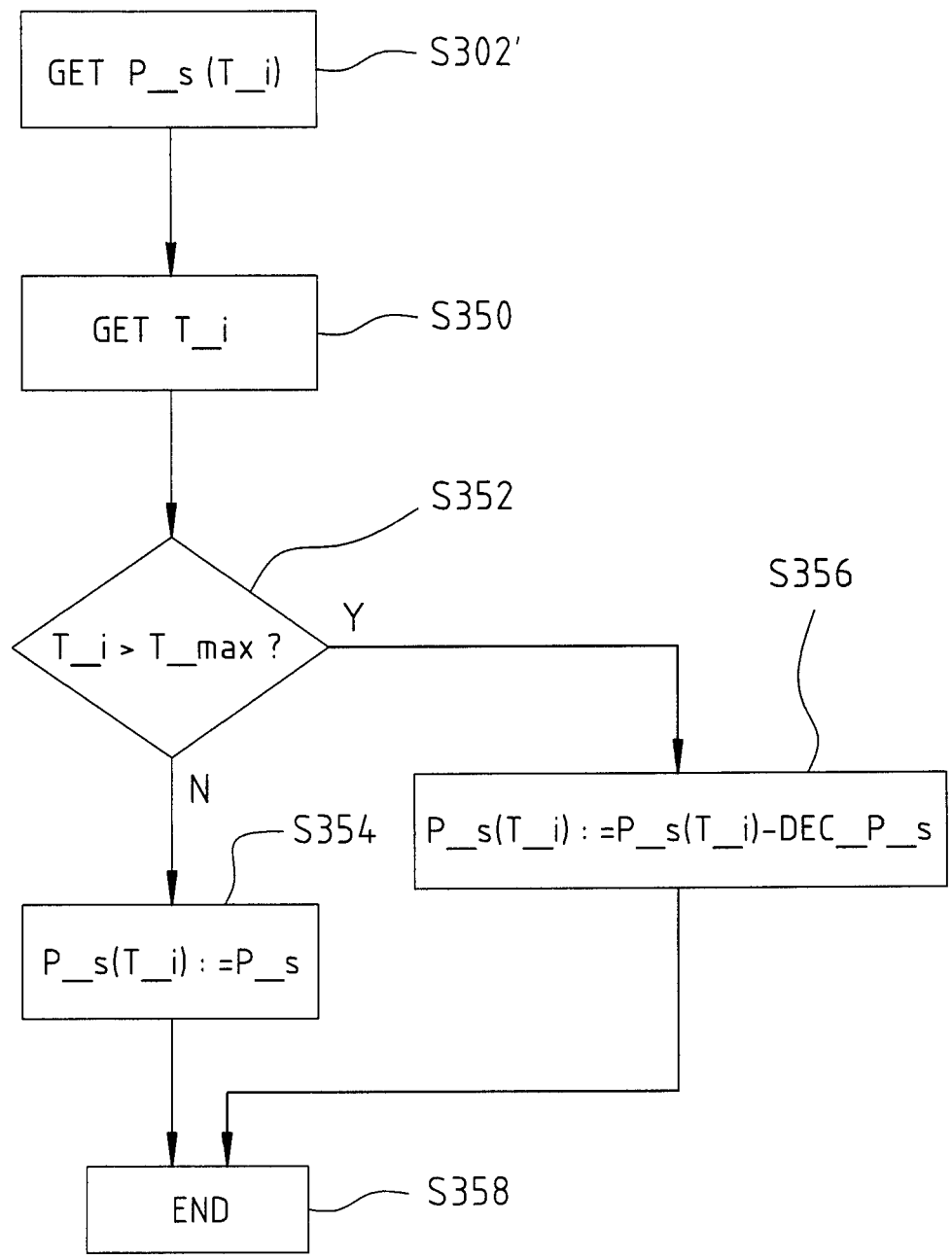
Figure 13:
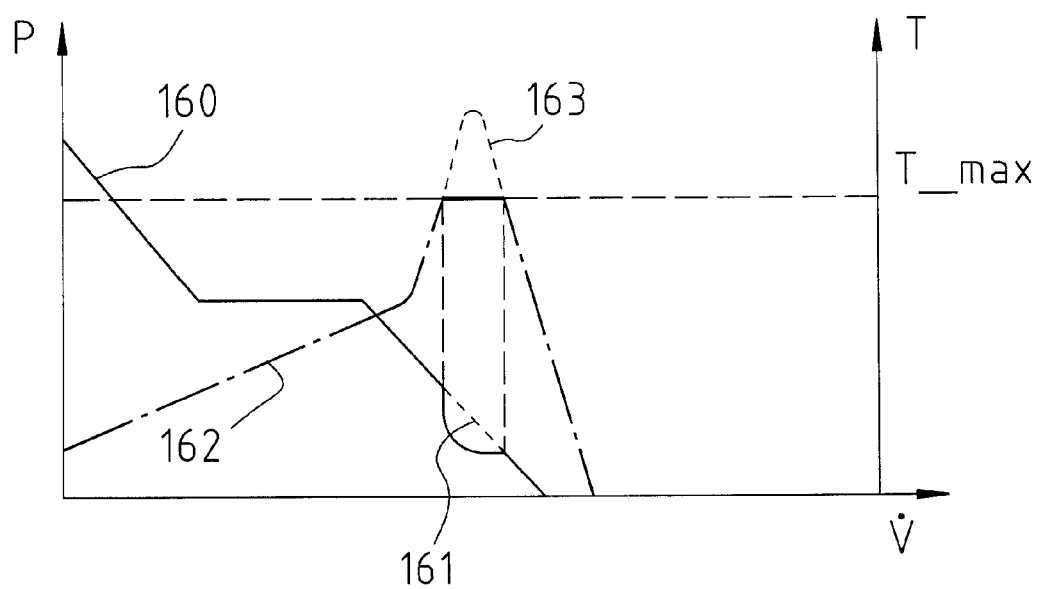

FIG. 1 schematically depicts an axial fan whose fan wheel 18 is driven by the external rotor of an external-rotor motor; an NTC temperature sensor that serves to measure a temperature associated with the motor is arranged in the stator, FIG. 2 is a circuit diagram for a fan in accordance with FIG. 1, FIG. 3 depicts the fan characteristic curve for a diagonal fan according to the existing art (dashed line), and a fan characteristic curve for an improved diagonal fan, FIG. 4 depicts the rotation speed plotted against flow rate, a dashed line being used for the characteristic curve for a diagonal fan with rotation speed regulation (existing art), and a solid line being used for the rotation speed profile for the same diagonal fan in an improved embodiment, i.e. with minimum power level regulation, FIG. 5 depicts the motor current of a diagonal fan plotted against flow rate dV/dt, using a dashed line for a diagonal fan according to the existing art and a solid line for the improved embodiment, i.e. with a power level regulator, FIG. 6 is a depiction analogous to FIG. 5 but for the electrical power consumed by the drive motor, FIG. 7 is a schematic overview of the program executing in the μC of FIG. 2, FIG. 8 shows the program steps of a regulation routine according to the present invention from the program of FIG. 7, FIG. 9 shows the program steps of a power level regulator of FIG. 8, FIG. 10 shows a regulator according to the present invention in which power level regulation occurs before rotation speed regulation, FIG. 11 shows a regulator according to the present invention in which rotation speed regulation occurs before power level regulation, FIG. 12 shows program steps for a temperature-dependent target value P_s(T_i) for power level regulation, and FIG. 13 is a pressure increase/flow rate diagram with temperature limiting.

DETAILED DESCRIPTION

FIG. 1 shows, by way of example, an axial fan 10 according to the existing art. The latter has a fan housing 12 that is depicted in section. Mounted inside fan housing 12 by means of spokes 14 (so-called "retaining spider") is an external-rotor motor 16 that serves to drive a fan wheel 18 that is equipped with fan blades 20.

The rotation direction is labeled 21.

An NTC (Negative Temperature Coefficient) resistor 22, that enables monitoring of the temperature in the interior of motor 16u is arranged on the stator of motor 16.

A fan of this kind has characteristic curves such as those plotted in FIGS. 3 to 6 using dashed lines. A saddle 76, i.e. a discontinuity, occurs in a region of the flow rate (here, for example, from 200 to 600 m³/h) as a consequence of the fact that the air flow along fan blades 20 detaches in that region. In practice, this phenomenon limits the use of fan 10 to higher flow rate values, for example to values above approximately 600 m³/h in the example according to FIGS. 3 to 6.

FIG. 2 is a schematic circuit diagram for fan 10 of FIG. 1. Fan 10 has a terminal 27 for the operating voltage UB, a terminal 28 for ground GND, a microprocessor or microcontroller μC 23 controllable by a program, and drive motor 16 having a stator 17 and rotor 18. Suitable microcontrollers are well known in the art and are available, for example, from Microchip Corp. of Chandler, Ariz., USA.

A control device 28 (e.g. computer) is connected via a bidirectional control lead 29 to a terminal 101 of μC 23.

Operating voltage UB is guided from terminal 27 via a pi filter 24 and a polarity protection diode 25 to a lead 30, where it is available as a link circuit voltage UZK.

Lead 30 is connected via a link circuit capacitor 33 (e.g. an electrolytic capacitor) to a node 34 that is connected both via a resistor 35 and via a switch 36 (e.g. an FET) to ground GND. Switch 36 is connected via a lead 37 to an output O7 of μC 23 and is controllable by the latter.

Lead 30 is connected via a resistor 38 to a node 39, and node 39 is connected via a resistor 45 to ground GND and via a lead 46 to an input ADC UZK of μC 23. Resistors 38, 39 constitute a voltage divider.

A temperature sensor 22 (e.g. an integrated semiconductor temperature sensor, thermistor, resistance thermometer) is arranged on stator 17 and is connected via a lead 47 to an input ADC_T of μC 23.

Stator 17 has a three-phase winding arrangement 40 having three strands 41, 42, 43, which are interconnected by way of example as a delta circuit. Stator 17 has an output stage 19 that is implemented as a full bridge circuit having three upper switches S1, S2, S3 and three lower switches S4, S5, S6 between lead 30 and a bottom node 40; switches S1 to S6 (e.g. N-channel FETs, P-channel FETs, MOSFETs, transistors) each have associated with them a driver IC T1 to T6 controllable via outputs O1 to O6 of μC 23.

Bottom node 48 is connected via a bottom node resistor 49 to ground GND.

Bottom node 48 is connected via a lead 50 to input ADC_I of μC 23.

A Schmitt trigger 52 (threshold value switch) is connected at its "plus" input to bottom node 48 and at its "minus" input to a node 55 to which a reference voltage is applied via a voltage divider, having resistors 54, 56, connected between a +5 V voltage and ground GND. The output of Schmitt trigger 52 is connected via a lead 58 to an input I1 of the μC.

Three rotor position sensors 60 (e.g. Hall ICs, magnetoresistive (MR) sensors) are arranged at rotor 18, and their signals travel via one or more leads 61 to one or more inputs I2 of μC 23. Alternatively, sensorless rotor position detection is also possible.

Mode of Operation

Pi filter 24 filters interference out of the operating voltage UB. The voltage UZK at the DC link circuit or at lead 30 is smoothed by link circuit capacitor 33, and the latter can also buffer currents from output stage 19. Switch 36 is open for two seconds, for example, upon switch-on, so that link circuit capacitor 33 charges slowly through resistor 35. The result is that the switch-on current is limited upon startup so that the voltage source at terminals 27 and 28 is not too heavily stressed. After the predefined time, switch 36 is closed and resistor 35 is thus bypassed.

The link circuit voltage UZK is transformed by voltage divider 38, 45 into a range suitable for μC 23 and is delivered via lead 46 to μC 23, where it is then converted, for example via an A/D converter (ADC), into a signal U_i that characterizes the instantaneous link circuit voltage UZK.

Driver ICs T1 to T6 are preferably used to drive output stage switches S1 to S6. On the one hand, the power level at outputs O1 to O6 of μC 23 is usually not sufficient to drive output stage transistors S1 to S6 directly; on the other hand, when driver ICs are used, it is possible to use N-channel FETs (which as a rule have better properties than P-channel FETs) both for upper switches S1 to S3 and for lower switches S4 to S6. FET=Field Effect Transistor.

Output stage 19 is preferably driven in on-off fashion by μC 23, e.g. using a PWM (Pulse Width Modulation) signal having a pulse duty factor TV. Also preferably, output stage 19 is driven with complementary on-off switching, in which, when an upper switch is switched off, the current circulates not through the associated recovery diode (not depicted), but instead through the complementarily switched-on switch.

A driving system of this kind is disclosed, for example, in WO 00/28646 A2 (and corresponding U.S. Pat. No. 6,452,349).

The current at bottom node 48 flows through resistor 49 to ground GND, so that the voltage U48 at node 48 is proportional to the current I48. The voltage U48 is delivered through lead 50 to μC 23, where it can be converted via an A/D converter into a signal I_i that characterizes the current through bottom node resistor 49 and thus also the current I_UZK flowing from link circuit 30 into output stage 19.

The voltage U48 is also delivered to threshold value switch 52 for current limiting. Threshold value switch 52 has applied to its "minus" input a reference voltage that corresponds to a maximum permissible current I48. When the voltage at the "plus" input is greater than the voltage at the "minus" input of threshold value switch 52, the signal 58 at the output of threshold value switch 52 changes, causing the triggering via terminal I1 of μC 23 of, for example, an interrupt that can very quickly limit the current through output stage 19. For this, for example, the pulse duty factor TV of the PWM signal is entirely or partly reduced.

The signal of rotor position sensors 60 is delivered via input I2 to μC 23, and the latter can ascertain therefrom the points in time for commutating output stage 19 and the instantaneous rotation speed n_i.

By means of control device 28, operating data (e.g. target rotation speed n_s, target value for power level P_S, maximum rotation speed n_max) can be delivered to μC 23, and operating data values (e.g. faults) can be transmitted in the opposite direction.

A control system CTRL 65 for motor 16 is implemented in μC 23, for example via software, which system comprises, inter alia, routines for commutating the output stage (COMMUT), for rotation speed regulation (n_RGL), and for minimum power level regulation P_RGL.

Sensing a Value P_I Characterizing the Power Level

The value characterizing the consumed power can be calculated from the measured voltage U_i and the measured current I_i, as $$P\_i := U\_i * I\_i$$

Outputting the SW (Control Output) Signal

The signal SW must be suitable for influencing the power consumed by motor 10, and thus the latter's rotation speed. The motors involved can be, for example, DC motors or AC motors, synchronous motors or asynchronous motors. The following can be specified, for example, as a signal SW:

- a control output for a current control system, e.g. as a pulse duty factor for an on-off switched output stage, as disclosed, for example, in WO 00/28646 A2 (and corresponding U.S. Pat. No. 6,452,349, HAHN & RAPPENECKER)
- a control output for a current regulation system, for example to influence the pulse duty factor for an on-off switched output stage, as disclosed, for example, in WO 02/19510 A1 (and corresponding U.S. Pat. No. 6,825,632, HAHN & RAPPENECKER)
- a control output for a DC link circuit voltage control system (see e.g. WO 2006/089605 (and corresponding U.S. Pat. No. 7,880,427, Föll et al.)
- a control output for a DC link circuit voltage control system and a control output for a current control system, i.e. a combination of two control outputs. It can be useful, for example, to increase the voltage at high rotation speeds but to effect regulation principally via the current control system.

Rotation speed target value.

FIG. 3 is a diagram of pressure increase versus flow rate, FIG. 4 a diagram of rotation speed versus flow rate, FIG. 5 a diagram of current versus flow rate, and FIG. 6 a diagram of power level versus flow rate.

The characteristic curves 71 (FIG. 3), 72 (FIG. 4), 73 (FIG. 5), and 74 (FIG. 6), depicted with dashed lines, were measured with a diagonal fan having rotation speed regulation to a target rotation speed n_soll=6500 min$^{-1}$. The characteristic curves 81 (FIG. 3), 82 (FIG. 4), 83 (FIG. 5), and 84 (FIG. 6) depicted with solid lines were measured with a diagonal fan having rotation speed regulation to a target rotation speed n_soll=6500 min$^{-1}$ and additional regulation of the power level to at least 270 W.

Curves 81, 71 are also referred to as "standard" characteristic curves and are measured in accordance with (German Industrial) standard DIN 24163 part 3 in a suction-side double-chamber test stand. More simply, a measurement can also be made using a fan and an impact plate arranged on the outlet side of the fan. The impact plate is displaced in the direction of the fan, with the result that the static pressure difference on the outlet side rises, and the pressure difference and the flow rate are measured on the outlet side.

The fan hardware used in both cases was a diagonal fan having a correspondingly adapted driving system. The diagonal fan used has a six-pole ceramic magnet that is obliquely magnetized, a three-phase winding, a rated voltage U_nenn=48 V, a maximum power level P_max=350 W, and a maximum mechanical rotation speed n_max_mech=7500 min$^{-1}$. The exact type of fan is not crucial, however, in terms of the regulation system.

Curve 71 (rotation speed regulation only) has a rising slope in the region from 1080 m$^2$/h to 600 m$^3$/h, so that for a decreasing flow rate the pressure increase rises. In the region from 600 m$^3$/h to approx. 320 m$^3$/h, conversely, the pressure increase drops, and in the region from approx. 320 m$^3$/h to 0 m$^3$/h it rises again, so that a so-called "saddle" 78 forms in the region from approx. 200 m$^3$/h to 600 m$^3$/h.

The downward-sloping pressure increase in the region from 600 m$^3$/h to approx. 320 m$^3$/h is disadvantageous for cooling purposes, since both the flow rate and the pressure increase decrease. For this reason, in practice a preferred working region 75 for the fan, located to the right of saddle 78, is indicated.

The diagrams of FIG. 5 and FIG. 6 have curve shapes that are largely identical, since for the regulated voltage U_const=48 V that is used, the average consumed power level P is proportional to the average motor current I that is consumed, i.e.:

$$P = U\_const * I.$$

What will be considered below is therefore the consumed power level P; for a constant-voltage regulation system the current I could just as easily be considered, and power level regulation can also be effected as a combined current and voltage regulation process.

At the target rotation speed n_soll=6500 min$^{-1}$ a saddle-shaped region 76 of the consumed power level P occurs, for example in this case at a flow rate from approx. 160 to 560 m$^3$/h. In this saddle-shaped region 76 the consumed power level P drops off as shown by curve 74 (rotation speed regulation only) from approximately 290 W to approximately 200 W. Saddle-shaped region 76 occurs because in this flow rate region, the air flow along fan blades 20 detaches.

The result of this is that less torque is transferred by the fan blades to the air being delivered, and (with rotation speed regulation) the consumed power level P in saddle-shaped region 76 drops, as is evident from line 74 in FIG. 6.

In practice, because of this detachment effect the use of fan 10 is limited to or specified for higher flow rate values, i.e. in this case, for example, to values of 600 m$^3$/h or higher.

Curve 84 in FIG. 6 shows the effect of rotation speed regulation with override power level regulation to at least 270 W.

With rotation speed regulation only, the consumed power in saddle-shaped region 76 would drop below 270 W. The override minimum power level regulation system therefore becomes active in this region, and holds the consumed power at approx. 270 W. As a result, in saddle-shaped region 76 the rotation speed is increased from approx. 2500 min$^{-1}$ to as much as approx. 7350 min$^{-1}$ at a flow rate of approx. 370 m$^3$/h, as is evident from mountain-shaped region 77 of curve 82 in FIG. 4.

A fan of this kind, having rotation speed regulation and override minimum power level regulation, can also be operated in saddle-shaped region 76 (FIG. 6) and at a lower flow rate, and even in this region a sufficient air flow can be guaranteed, for example, for sufficient cooling of components that require cooling.

Expressed visually, the saddle-shaped or valley-shaped region 76 of curve 74 in FIG. 6 becomes filled up or "ironed out" by the override minimum power level regulation routine.

The target value P_s for the minimum power level is preferably predefined in such a way that in the saddle-shaped region, the rotation speed n_i rises into the region of the mechanical limit rotation speed n_max_mech (in this case 7500 min$^{-1}$). A rotation speed n_i that is greater than 0.7*n_max_mech, particularly preferably greater than 0.8*n_max_mech, and particularly preferably greater than 0.9*n_max_mech is preferably reached in saddle-shaped region 76.

FIG. 7 provides a schematic overview of the program executing in μC 23 of FIG. 2. Upon startup of μC 23 of FIG. 2, in step S280 an initialization INIT occurs in which variables are set, the motor is prepared for startup, and optionally is in fact started.

In S282, regulator RGL is activated in order to output at least one control output SW.

In S284 a routine IO is called which carries out an input and output via lead 29 of FIG. 2.

In S286 a routine OTHER is then called in which, for example, further steps such as temperature monitoring are carried out.

Execution then branches back to step S282, so that the main program is cycled through in loop fashion.

The routine RGL in S282 is called, for example, every 0.5 second in order to ascertain the control output.

An I2 interrupt of input I2 of FIG. 2 is labeled S291, and an I1 interrupt of input I1 of FIG. 2 is labeled S293.

The I2 interrupt S291 causes an interrupt routine COMMUT S292, which controls the commutation of output stage 19, to be called. In the context of commutation with "ignition advance," it is usual to additionally use timers that control commutation via corresponding timer interrupts (not depicted).

The I1 interrupt S293 calls an interrupt routine S294 when an overcurrent occurs at bottom node 48 of FIG. 2. The interrupt routine S294 thereupon sets outputs O1 to O6 of FIG. 2 in such a way that the overcurrent quickly decays.

FIG. 8 shows an exemplifying embodiment for a regulator RGL that is implemented as software in μC 23 of FIG. 2.

Upon startup of the motor, in step S280 of FIG. 7 the following variable, among others, is set during initialization:

$$do\_n\_RGL: -1$$

The variables P_min (power level at which switchover to power level regulation occurs), P_s (target value for power level regulation), and n_s (target value for rotation speed regulation) are set to predefined values. The routine RGL S300 is called during operation at predefined intervals, and determines the control output SW for influencing motor 10.

In step S302, present values for the variables P_i, n_i, P_min, P_s, n_s are retrieved or calculated (for example, P_i:=U_i*I_i). Step S304 checks whether the variable do_n_RGL has a value of 1, i.e. whether rotation speed regulation is to be carried out. If Yes, step S306 then checks whether the instantaneous consumed power level P_i is less than the minimum power level P_min.

If No, then in step S308 a rotation speed regulation action is carried out and a corresponding control output is ascertained and, if applicable, immediately outputted. Execution then branches back to step S314.

If Yes, then in step S310 the variable do_n_RGL is set to zero, with the result that rotation speed regulation is switched off and power level regulation is switched on. This can be the case, for example, if an air filter of a fan is clogged. This causes a change in pressure conditions and in flow rate, and flow detachment at the fan blades occurs. For most types of fan, the fact that the power level has fallen below the minimum P_min is a clear indication that the flow has already detached. Execution then branches to step S314. Alternatively, the check at S306 can occur after rotation speed regulator S308 is called.

In step S314 a check is made, based on the variable do_n_RGL, as to whether power level regulation is to be carried out (value of zero).

If Yes, in step S318 a power level regulation routine P_RGL S318 is carried out and the control output SW is correspondingly ascertained and, if applicable, immediately outputted. Step S320 then checks whether the present power level P_i is greater than or equal to the minimum power level P_min.

If No, execution branches to the end S328, since the present power level P_i must be further increased by power level regulator S318.

If Yes, execution branches to step S324.

Step S324 checks whether the present rotation speed n_i is less than the target rotation speed n_s.

If Yes, the motor is in a region of the characteristic curve in which the consumed power level at the target rotation speed n_s is greater than the minimum power level P_min. In this case, in S326 the variable do_n_RGL is set to a value of 1 so that rotation speed regulation is activated again, and execution then branches to the end S328. If the result in step S324 was No, however, execution branches to the end S328 and at the next call a power level regulation routine is again carried out.

In the power level regulation routine in step S318, the instantaneous power level P_i is regulated to the target value P_s. The target value P_s can correspond to the value P_min for the minimum power level. The minimum power level P_min can, however, also be lower (for example, P_min: =0.9*P_s), so that the switchover to power level regulation in S306 does not occur immediately if the target value P_s is reached briefly, but instead occurs only at a lower value P_min.

The result is that either a rotation speed regulation routine is carried out in S308, or power level regulation is carried out in S318. As a result of the check in S306, if the power level falls below the minimum P_min a changeover to power level regulation occurs, or a deactivation of rotation speed regulation and activation of power level regulation; and in the case of power level regulation, what occurs in S324 when the rotation speed falls below the target value n_s is a changeover to rotation speed regulation or a deactivation of power level regulation and activation of rotation speed regulation.

Alternatively, the check in S320 can be omitted, so that execution branches from S318 directly to S324, for example if the power level regulator in S320 generally results in the target power level P_s being reached quickly.

Alternatively, the changeover from power level regulation back to rotation speed regulation according to S324 can be omitted or can be linked to an additional condition (e.g. a predefined elapsed time since the switchover to power level regulation, external instruction, or reset).

P_min With Dependence on n_s

The value P_min for the minimum power level is preferably set to a value suitable for the target rotation speed n_s, for example based on the fan characteristic curve for rotation speed regulation to the target rotation speed.

Also preferably, the value P_min is selected or calculated as a function of the target rotation speed n_s, i.e. P_min=f(n_s). A minimum power level P_min adapted to the target rotation speed n_s must therefore be predefined.

For example, if a low target rotation speed n_s is predefined, the consumed power level P_i will likewise be low.

A high minimum power level P_min would then cause the power level regulation function to be (almost) always active.

P_min can be calculated from n_s using the correlation $$P1*(n2/n1)^3 = P2,$$

which is valid at constant pressure (dp=0) for a first power level/rotation speed pair P1, n1 and a second power/rotation speed pair P2, n2.

The "fan constant" nevertheless needs to be inputted. This can be done, for example, by specifying that at its maximum rotation speed of 6700 rpm, the fan consumes a power level of 300 W. A suitable value for n_s is then obtained via P_min=300 W*(n_s/6700 rpm)$^3$.

FIG. 9 shows a power level regulator S318' that can be used in step S318 in FIG. 8. Besides power level regulation, the power level regulator [P_RGL(P_s, P_i, n_max)] S318' additionally contains rotation speed regulation to a maximum rotation speed n_max.

In S330 a PID regulator is executed. The meanings of the variables will be listed below:

e System deviation
esum Sum of previous system deviations e for the I component
SW Control output (control variable)
Kp Gain factor for the P component
Ki Factor for the I component
Ta Sampling time
Kd Factor for the D component
ealt Old system deviation for the D component.

Assuming PID controller S330 is called at regular intervals (e.g. every 0.5 second), the sampling time Ta is constant and can be integrated into the factors Ki and Kd.

The use of a PID (Proportional Integral Derivative) controller has proven advantageous, but the use of, for example, a PI (Proportional Integral) controller or PD (Proportional Derivative) controller is also possible.

In S332 the control output SW is outputted (OUTPUT SW). In step S334 the present rotation speed n_i is then ascertained (GET n_i), optionally after a predefined time period. S336 (n_i>n_max?) checks whether the present rotation speed is greater than the maximum rotation speed n_max. If Yes, the control output SW is decreased in S338 by a predefined value DEC_VAL (e.g. 1), and is outputted by the fact that execution branches to S332. This occurs as long as the rotation speed is less than or equal to the maximum rotation speed n_max. The result is to implement a rotation speed limitation in order to protect the motor from damage. Execution then branches to S340 and leaves the regulator routine.

FIG. 10 shows an exemplifying embodiment of a rotation speed regulator with override minimum power level regulation.

A rotation speed regulator n_RGL 102 and a minimum power level regulator P_i>P_min! 104 are associated with a motor 10.

A signal n_s (target rotation speed) is delivered via a lead 106 to an adder 108. A signal n_s_2 is delivered from the output of adder 108 via a lead 110 to a differentiator 113. A signal n_i (actual value of rotation speed) is delivered from motor 10 to differentiator 113 via a lead 114. A signal n_DIFF is delivered from the output of differentiator 113 via a lead 116 to rotation speed regulator 102. A signal SW (control output) is transferred via a lead 118 from rotation speed regulator 102 to motor 10, and the control output SW influences the motor power level and/or the rotation speed of motor 10.

A signal P_i (consumed power of motor 10) is delivered via a lead 120 to a differentiator 122, and a signal P_min (required minimum power level) is also delivered to it via a lead 124. A signal P_diff (difference between P_min and P_i) is delivered via lead 126 to power level regulator 104. A signal n_s_1 is delivered from the output of power level regulator 104 via a lead 128 to adder 108.

Mode of Operation

Power level regulator 104 is inactive as long as the power level P_i consumed by motor 10 is greater than or equal to the minimum power level P_min. In this state, the signal n_s in adder 108 is not influenced, and rotation speed regulation of motor 10 is carried out via rotation speed limiter 111, differentiator 113, and rotation speed regulator 102 by the fact that the signal SW of rotation speed regulator 102 is outputted to motor 10.

The signal SW influences the power consumed by the motor, and thus also the rotation speed. It can be used, for example, as

- a specification for the pulse duty factor of an output stage that is on-off switched using a PWM signal,
- a specification for a motor current control function,
- a specification for a power level control function, or
- a specification for controlling the voltage applied to the output stage.

Power level regulator 104 becomes active when the power level P_i consumed by motor 10 is less than the minimum power level P_min. In this state, power level regulator 104 outputs a signal n_s_1≠0, and this modifies the signal n_s as follows:

$$n\_s\_2 := n\_s + n\_s\_1.$$

The signal n_s_2 that represents the target value of the rotation speed for rotation speed regulator 102 is thereby increased, and this also results in a modified signal SW and thus a higher power level P_i of motor 10. In this context, the rotation speed limiter n_s_3:=MIN(n_s_2, n_max) ensures that the target rotation speed n_s_3 does not become greater than the predefined maximum rotation speed n_max, by the fact that n_s_3 is set to the lower value (minimum) of n_s_2 and n_max. Power level regulator 104 thus cannot cause damage to the motor due to an excessive rotation speed.

The result achieved by power level control system 104 is that the power level P_i consumed by motor 10 during operation is at least as great as the predefined power level P_min. Although both regulators—n_RGL 102 and P_i>P_! 104 (especially via adder 108)—influence the control output SW, the result of the interaction of the regulators is that depending on the working region, the control output SW is determined either by the rotation speed regulator n_RGL 102 or by the minimum power level regulator P_i>P_s! 104, so what occurs is either regulation to the predefined rotation speed n_s, or regulation to the minimum power level P_s.

Because the power level P_i as motor 10 starts (prior to ramp-up) can be less than P_min, power level regulation is preferably activated only after a predefined time after the motor has started (e.g. 3 seconds), or else after a predefined rotation speed (e.g. 1000 min$^{-1}$) has been reached.

When a fan 10 of this kind is used, in specific applications it can be advantageous, in the case of activation of power level regulation 104, to switch over entirely to that system at least temporarily. When the fan is used in an electrical cabinet, for example, filter mats or nonwovens are provided in the region of the air inlets, and as long as they allow air to pass easily, the fan should run quietly and at a constant rotation speed. If the filter mat clogs up over time, however, the pressure difference between the interior and exterior of the electrical cabinet then changes, and the flow rate is lower. If the power level P_i then drops below the minimum value P_min, the fan is then switched over continuously to power level regulation. After the fan is reset or restarted, another attempt is then made to carry out rotation speed regulation.

FIG. 11 shows a variant of the control routine of FIG. 10, in which the override power level regulation routine acts behind the rotation speed regulator.

The signal n_s is delivered via a lead 130, and the signal n_i having the instantaneous rotation speed of motor 10 via a lead 133, to a differentiator 132. The calculated difference n_DIFF is delivered via a lead 134 to rotation speed regulator n_RGL 102. The signal SW1 (control output 1) produced by rotation speed regulator 102 is delivered via a lead 136 to an adder 138, and via the latter's output lead 140 a signal SW (control output) is delivered to motor 10.

The signal P_s is delivered via a lead 144, and the signal P_i (instantaneous power level of motor 10) via a lead 148, to a differentiator 146. The difference P_DIFF is delivered via a lead 150 to minimum power level regulator P_i>P_s! 104. The signal SW2 (control output 2) produced by minimum power level regulator 104 is delivered via a lead 152 to an adder 138.

The introduction of minimum power level regulation routine 104 in adder 108, and thus below rotation speed regulator 102, can in specific cases result in a faster response of motor 10 to the influence of power level regulator 104. This is the case, for example, when a high I component is provided in rotation speed regulator 102.

A comparison apparatus (not depicted), which ascertains the signal SW as follows $$SW:=MAX(SW1,SW2),$$

can, for example, also be provided instead of adder 138.

The greater signal of signals SW1 and SW2 would thus be used as signal SW.

FIG. 12 is a flow chart for generating a temperature-dependent target value P_s(T_i) for power level regulation; the value P_s(T_i) can be used in all the preceding exemplifying embodiments, in order to avoid damage to the motor due to excessive temperature.

The routine GET P_s(T_i) S302' can be executed, for example, in step S302 of FIG. 8.

In S350, the present temperature value T_i ascertained. S352 checks whether the present temperature value T_i is greater than a predefined maximum permissible temperature value T_max.

If No, the temperature is OK, and in S354 the value P_s(T_i) is set to the predefined target value P_s and execution branches to the end S358.

If Yes, the temperature is too high, and in S356 the value P_s(T_i) is decreased by a predefined value DEC_P_s (e.g. 1 or 5), and execution branches to the end S358.

The result is that the power level, and thus also the temperature T_i influenced thereby, is decreased by way of the control output SW, and the temperature does not rise above the limit value T_max. It is thus possible to limit the temperature to the value T_max.

FIG. 13 shows a characteristic curve 160 in the flow rate/pressure increase diagram, and the temperature T_i 162 is additionally plotted against flow rate dV/dt. In the context of a temperature-independent target value P_s for power level regulator P_RGL, in region 163 the temperature would rise above the maximum permissible temperature T_max, and this could result in damage to the motor.

By means of the temperature-dependent target value P_s(T_i), the curve 160 is lowered in region 163 because of the decreasing power level and rotation speed from 161, with the result that the temperature T_i is limited to T_max.

Many variants and modifications are of course possible in the context of the invention.

For example, all fan types, e.g. axial, diagonal, and radial fans, are suitable.

The apparatus for generating a temperature signal T_i can be implemented, for example, as follows:
a) Temperature sensor for measuring the temperature (T_i) in the electronics of drive motor 16
b) Temperature sensor for measuring the temperature (T_i) in the stator
c) Apparatus for determining the temperature (T_i) from a measurement of the temperature-dependent resistance of the stator winding
d) Apparatus for determining the temperature (T_i) from a measurement of the temperature-dependent inductance in the stator winding that is caused by the rotor magnets (motor inductance).

FIGS. 1 to 13 show a fan that comprises: a drive motor having a fan rotor, an apparatus for generating a rotation speed signal n_i that characterizes the rotation speed of the fan rotor, an apparatus for generating a power level signal P_i that characterizes the power level consumed by the drive motor, a first regulator n_RGL for regulating the rotation speed signal n_i to a predefined rotation speed target value n_s, a second regulator P_RGL for regulating the power level signal P_i to a predefined power level signal target value P_s that corresponds to a predefined minimum consumed power level P_min, where first regulator n_RGL and second regulator P_RGL output at least one control output SW to the drive motor and interact in such a way that during operation, the at least one control value SW
    in a first state is determined by first regulator n_RGL, and
    in a second state is determined by second regulator n_RGL,
where a first changeover from the first state to the second state occurs when a first condition having at least one first criterion exists.

The first condition preferably comprises the criterion that the power level signal P_i corresponds to a consumed power level that is less than the minimum consumed power level P_min, in order to influence the power level signal P_i so that it corresponds to a consumed power level that is equal to or greater than the minimum consumed power level P_min.

The first condition preferably additionally comprises the criterion that the rotation speed signal n_i is at least as great as a predefined rotation speed, where the predefined rotation speed preferably corresponds to the rotation speed target value n_s.

First regulator n_RGL and second regulator P_RGL preferably interact in such a way that after a first changeover, the second state is at least temporarily maintained even when the instantaneous rotation speed is less than the rotation speed predefined by the first regulator n_RGL.

First regulator n_RGL and second regulator P_RGL preferably interact in such a way that a second changeover from the second state to the first state occurs when a second condition having at least one second criterion exists.

The second condition preferably comprises the criterion that the rotation speed signal n_i is less than the rotation speed target value n_s.

The second condition preferably additionally comprises the criterion that the power level signal P_i corresponds to a consumed power level that is at least as great as the minimum consumed power level P_min.

The fan characteristic curve for flow rate versus power level preferably exhibits a saddle region 76, and the predefined minimum consumed power level P_min is preferably selected in such a way that the control output SW in the saddle region is determined at least in part by second regulator P_RGL, and outside the saddle region is determined at least in part by first regulator n_RGL.

The fan preferably comprises a rotation speed limiting apparatus n_i<n_max! for limiting the rotation speed signal n_i to a rotation speed signal limit value n_max, which rotation speed signal limit value n_max corresponds to a predefined maximum rotation speed, where first regulator n_RGL, second regulator P_RGL, and the rotation speed limiting apparatus output the at least one control output SW to the drive motor and interact in such a way that the predefined maximum rotation speed is not exceeded during operation.

The fan preferably comprises an apparatus for generating a temperature signal T_i that characterizes a motor temperature; the power level signal target value P_s for power level regulator 36 is modified as a function of the temperature signal T_i in order to avoid an overload of drive motor 16 or of its electronics.

The power level signal target value P_s is preferably decreased when the temperature signal T_i corresponds to a temperature that is at least as great as a predefined maximum temperature value T_max.

FIGS. 1 to 13 show a fan that comprises: a drive motor having a fan rotor, a first regulator n_RGL for regulating the rotation speed of the fan rotor to a rotation speed target value n_s, an apparatus for generating a power level signal that characterizes the power level consumed by the drive motor, a second regulator that, when the power level signal at the instantaneous rotation speed drops below a predefined power level signal limit value, brings about a regulation of the power level signal to a predefined power level signal target value.

FIGS. 1 to 13 show a fan having a fan rotor 18, a fan housing 12, and a drive motor 16, which fan exhibits a so-called saddle 76 in its fan characteristic curve at which the power consumption of fan 10 is reduced, which drive motor 16 has associated with it a power level regulator 36 whose output signal is converted into a signal n=f(P) for the rotation speed of fan 10 in order, by way of a rotation speed increase in the region of the saddle, to increase the power consumption there of fan 10.

The invention claimed is:

1. A fan comprising:
   a drive motor having a fan rotor;
   an apparatus for generating a rotation speed signal (n_i) that characterizes the rotation speed of the fan rotor,
   an apparatus for generating a power level signal (P_i) that characterizes the power level consumed by the drive motor;
   a first regulator (n_RGL) for regulating the rotation speed signal (n_i) to a predefined rotation speed target value (n_s);
   a second regulator (P_RGL) for regulating the power level signal (P_i) to a predefined power level signal target value (P_s) that corresponds to a predefined minimum consumed power level (P_min),
   where the first regulator (n_RGL) and the second regulator (P_RGL) output at least one control output signal (SW) to the drive motor and interact in such a way that, during operation, the value of said at least one control signal (SW)
      in a first state, is determined by the first regulator (n_RGL), and
      in a second state, is determined by the second regulator (n_RGL),
   and wherein a first changeover from the first state to the second state occurs, when a first condition, having at least one first criterion, pertains,
      where the first condition satisfies the criterion that the power level signal (P_i) corresponds to a consumed power level that is less than said minimum consumed power level (P_min), in order to influence the power level signal (P_i) applied to said motor of said fan, so that the power level signal corresponds to a consumed power level that is at least equal to the minimum consumed power level (P_min).

2. The fan according to claim 1, wherein the first condition satisfies a further criterion that the rotation speed signal (n_i) is at least as great as a predefined rotation speed, where the predefined rotation speed corresponds to the rotation speed target value (n_s).

3. The fan according to claim 1, wherein
   the fan has a characteristic curve for flow rate plotted versus power level;
   said characteristic curve exhibits a saddle region (76), and
   wherein a predefined minimum consumed power level (P_min), to be applied to said motor, is selected in such a way that the control output signal (SW), in the saddle region, is determined at least in part by the second regulator (P_RGL), and, outside the saddle region, is determined at least in part by the first regulator (n_RGL).

4. The fan according to claim 1, wherein the first regulator (n_RGL) and the second regulator (P_RGL) interact in such a way that after a first changeover, the second state is at least temporarily maintained, even when the instantaneous rotation speed is less than the rotation speed predefined by the first regulator (n_RGL).

5. The fan according to claim 4, wherein
   the first condition satisfies a further criterion that the rotation speed signal (n_i) is at least as great as a predefined rotation speed, where the predefined rotation speed corresponds to the rotation speed target value (n_s).

6. The fan according to claim 4, wherein
   the fan has a characteristic curve for flow rate plotted versus power level;
   said characteristic curve exhibits a saddle region (76), and
   wherein a predefined minimum consumed power level (P_min), to be applied to said motor, is selected in such a way that the control output signal (SW), in the saddle region, is determined at least in part by the second regulator (P_RGL), and, outside the saddle region, is determined at least in part by the first regulator (n_RGL).

7. The fan according to claim 4, further comprising
   rotation speed limiting apparatus (n_i<n_max!) for limiting the rotation speed signal (n_i) to a rotation speed signal limit value (n_max), which rotation speed signal limit value (n_max) corresponds to a predefined maximum rotation speed,
   and wherein the first regulator (n_RGL), the second regulator (P_RGL), and the rotation speed limiting apparatus output the at least one control output signal (SW) to the drive motor, and interact in such a way that the predefined maximum rotation speed is not exceeded during operation.

8. The fan according to claim 4, further comprising
   an apparatus for generating a temperature signal (T_i) that characterizes a motor temperature, and in which the power level signal target value (P_s) for the power level regulator (36) is modified as a function of the temperature signal (T_i) in order to avoid an overload of said drive motor (16) including regulator apparatus forming a portion thereof.

9. The fan according to claim 8, further comprising
   means for decreasing the power level signal target value (P_s) when the temperature signal (T_i) corresponds to a temperature that is at least as great as a predefined maximum temperature value (T_max).

10. The fan according to claim 1, wherein
    the first regulator (n_RGL) and the second regulator (P_RGL) interact in such a way that a second changeover, from the second state to the first state, occurs when a second condition, having at least one second criterion, pertains.

11. The fan according to claim 10, wherein the first condition satisfies a further criterion that
    the rotation speed signal (n_i) is at least as great as a predefined rotation speed, where the predefined rotation speed corresponds to the rotation speed target value (n_s).

12. The fan according to claim 10, wherein
    the fan has a characteristic curve for flow rate plotted versus power level;
    said characteristic curve exhibits a saddle region (76), and
    wherein a predefined minimum consumed power level (P_min), to be applied to said motor, is selected in such a way that the control output signal (SW), in the saddle region, is determined at least in part by the second regulator (P_RGL), and, outside the saddle region, is determined at least in part by the first regulator (n_RGL).

13. The fan according to claim 10, further comprising rotation speed limiting apparatus (n_i<n_max!) for limiting the rotation speed signal (n_i) to a rotation speed signal limit value (n_max), which rotation speed signal limit value (n_max) corresponds to a predefined maximum rotation speed, and wherein the first regulator (n_RGL), the second regulator (P_RGL), and the rotation speed limiting apparatus output the at least one control output signal (SW) to the drive motor, and interact in such a way that the predefined maximum rotation speed is not exceeded during operation.

14. The fan according to claim 10, further comprising an apparatus for generating a temperature signal (T_i) that characterizes a motor temperature, and in which the power level signal target value (P_s) for the power level regulator (36) is modified as a function of the temperature signal (T_i) in order to avoid an overload of said drive motor (16) including regulator apparatus forming a portion thereof.

15. The fan according to claim 10, further comprising means for decreasing the power level signal target value (P_s) when the temperature signal (T_i) corresponds to a temperature that is at least as great as a predefined maximum temperature value (T_max).

* * * * *